May 13, 1924.
A. BLUM
1,493,664
SAFETY SWIMMING BELT
Filed April 4, 1923
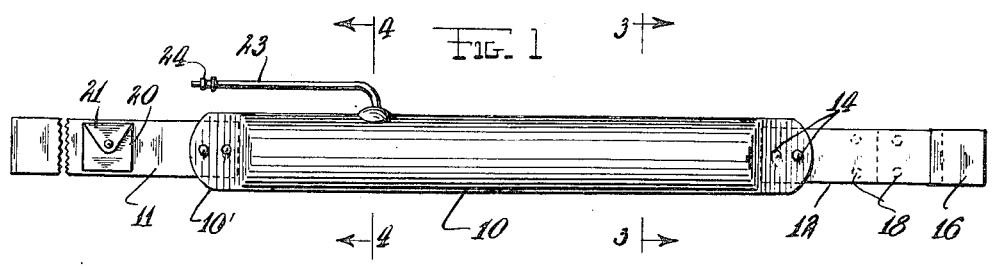
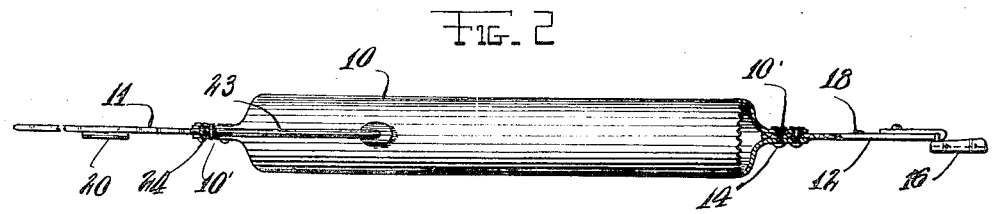
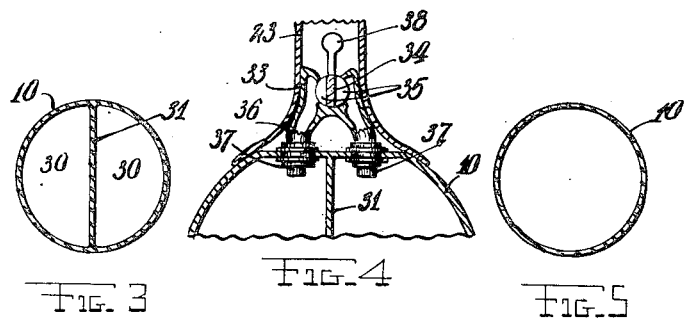
Inventor
Albert Blum
Attorney Patented May 13, 1924.

1,493,664

UNITED STATES PATENT OFFICE.

ALBERT BLUM, OF NEW YORK, N. Y., ASSIGNOR OF ONE-HALF TO RALPH M. SCHULMAN AND ONE-FOURTH TO SOLOMON JOSEPH, BOTH OF NEW YORK, N. Y.

SAFETY SWIMMING BELT.

Application filed April 4, 1923. Serial No. 629,897.

*To all whom it may concern:*

Be it known that I, ALBERT BLUM, a citizen of the United States, residing at New York, in the county of New York and State of New York, have invented certain new and useful Improvements in Safety Swimming Belts, of which the following is a specification.

This invention relates to life-belts such as are used to sustain people in the water, the invention having for an object the provision of a novel and simple form of life-belt of the pneumatic type.

For further comprehension of the invention, and of the objects and advantages thereof, reference will be had to the following description and accompanying drawings, and to the appended claims in which the various novel features of the invention are more particularly set forth.

Fig. 1 of the drawings is a longitudinal elevational view showing the belt extended.

Fig. 2 is a longitudinal view at right angles to Fig. 1, partly in elevation and partly in section.

Fig. 3 is a transverse sectional view taken on the line 3—3 of Fig. 1.

Fig. 4 is an enlarged fragmentary transverse section taken on the line 4—4 of Fig. 1.

Fig. 5 is a transverse sectional view taken on the same line as Fig. 3 but showing the belt without a partition.

My improved belt here comprises a piece of rubber tubing 10 flattened at the ends as at 10'. In these ends are inserted the ends of short straps 11 and 12 which may be of leather, canvas or any suitable material. The ends of these straps and of the tubing 10 are vulcanized together to ensure air and liquid tight joints, while rivets 14 may be passed through these ends to impart the necessary tensile strength to the joints.

The strap 12 carries a buckle element 16 while the other is provided with suitable openings, whereby they may be joined together and the belt secured around the waist of the user. Additional fastening devices may be provided in the form of stud and socket snap fasteners 18 spaced along these straps, it being understood that the stud and socket elements of these fasteners will be secured to the respective straps. The strap 11 may be provided with a pocket 20, closed by a flap 21, to carry coins or other things.

For inflation of the belt a length of flexible piping 23 is connected thereto at one end and is provided at its other end with a valve 24 of the type which opens automatically when air is blown into the pipe and then closes.

I prefer to separate my improved belt into two chambers or compartments 30, by means of the longitudinal partition web 31 of rubber, each of which compartments may contain air, or be inflated, independently of the other, I also provide in the inflation pipe 23 a valve device whereby, in the event that the wall of either chamber is punctured or leaks, the other chamber may be inflated. This valve device comprises a body 33 in which is a rotary plug 34 grooved on opposite sides to provide ports or air passages 35, which control the entrance to nipple elements 36 formed on the body 33 and communicating with one-way valves 37 of usual construction mounted in the walls of the respective chambers 30. Fixed to the plug 34 is a short stem or handle 38 which projects into the pipe 23. Ordinarily this stem 38 occupies the position shown in which case the air passes through both of the ports 35 and into each chamber in the belt. If the wall of one chamber is punctured, when the belt is to be inflated the stem is swung to one side of the pipe and closes the port 35 in the valve 33 which leads to this chamber. It will be apparent of course that the valves 37 will prevent escape of air from one chamber when the other is punctured, also that the flexibility of the rubber pipe allows the stem to be moved from side to side therein by pressure on the outside thereof.

Having thus described my invention what I claim as new and desire to protect by Letters Patent of the United States is as follows:

1. A life-belt comprising separate chambers, a common air conduit of flexible material connected to each of said chambers, a valve adapted to cut off the passage through the conduit to either chamber, and a stem for said valve located in said conduit.

2. A life-belt comprising a tube divided into two compartments by a longitudinal partition, one-way inflation valves leading into the respective compartments, a common air conduit branched to each valve, and a valve at the branching point of said conduit adapted to close either branch thereof.

3. A life-belt comprising a tube divided into two compartments by a longitudinal partition, one-way inflation valves leading into the respective compartments, a common air conduit branched to each valve, and a valve at the branching point of said conduit adapted to close either branch thereof, said valve including a rotary plug having a stem contained entirely within the said conduit.

In testimony whereof I have affixed my signature.

ALBERT BLUM.